F. HORNQUIST.
SLED RUNNER.
APPLICATION FILED APR. 19, 1913.
1,134,612.
Patented Apr. 6, 1915.
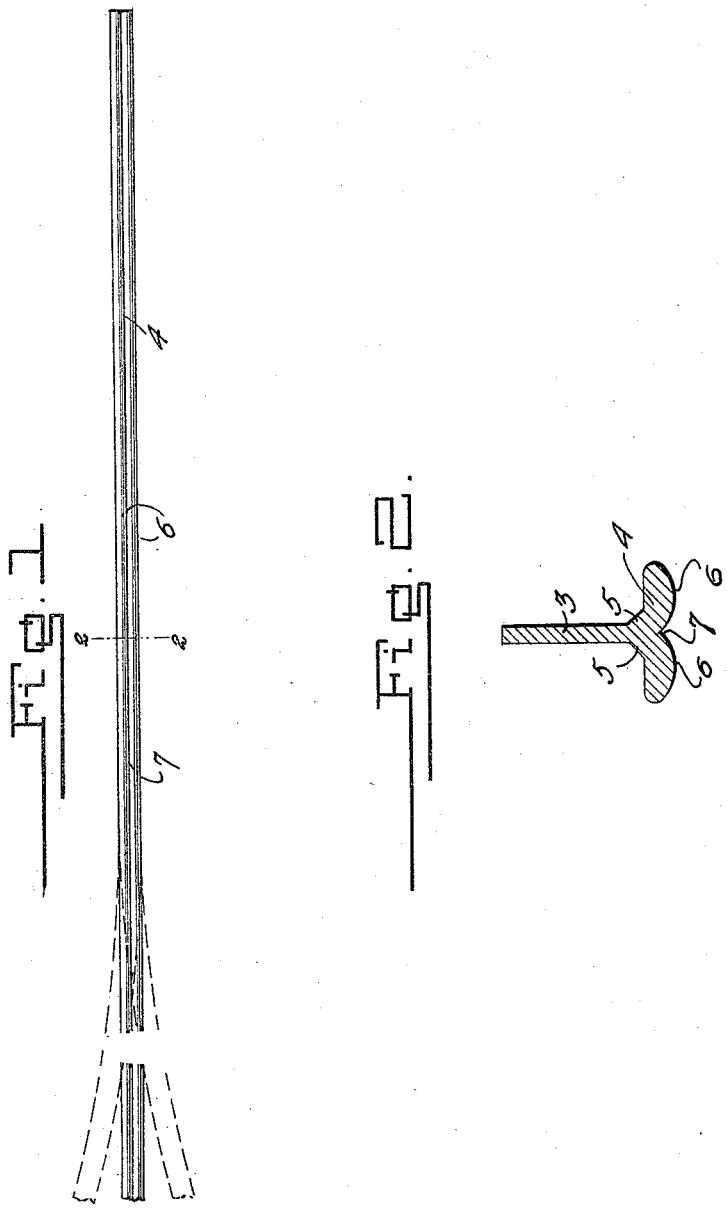
WITNESSES
E. M. Brooks.
Everett Lancaster
INVENTOR
Frank Hornquist,
his Attorney

UNITED STATES PATENT OFFICE.

FRANK HORNQUIST, OF MOUNT JEWETT, PENNSYLVANIA.

SLED-RUNNER.

1,134,612.  Specification of Letters Patent.  Patented Apr. 6, 1915.

Application filed April 19, 1913.  Serial No. 762,354.

*To all whom it may concern:*

Be it known that I, FRANK HORNQUIST, citizen of the United States, residing at Mount Jewett, in the county of McKean and State of Pennsylvania, have invented certain new and useful Improvements in Sled-Runners, of which the following is a specification.

My present invention relates to runners for sleds adapted to be drawn over snow or ice.

The principal object of my invention is to provide a runner having a tread portion so constructed as to prevent excessive skidding or side draft of the sled over smooth surfaces.

Another object of my invention is to provide a runner of such section that it is well adapted for use in starting the sled by flexing the runner laterally, without danger of providing a roughened edge to contact with the surface over which the sled is drawn, due to the compressing or expanding of the fiber making up the material of which the runner is constructed.

A still further object of my invention is ing marginal portions which could easily be manufactured and maintained in good repair, the runner having no sharp edges in close proximity to its tread, thereby avoiding marginal portions which could be easily roughened by contact with obstructions.

Further objects of my invention will appear in the following detailed description, taken in connection with the accompanying drawing forming a part of this specification, and in which drawing:—

Figure 1 is a bottom plan view of a sled runner constructed according to my invention. Fig. 2 is an enlarged sectional view on the line 2—2 of Fig. 1.

As disclosed in the drawing, the runner is preferably of an inverted T-shape section and may be formed of one continuous elongated piece of metal.

In the preferred form, 3 designates the web of the runner and 4 the head providing the tread of the runner. It is desirable to thicken the runner at the junction of the web with the head, as indicated at 5, since this adds strength and enables the force to be transmitted from the head portion to the web. The head is provided with a tread surface having the two longitudinally extending side sections thickened which in cross section form lobes positioned contiguous each other and meet at their inner edges as shown at 7 thereby forming a cusp. This construction provides the tread surface of the runner with a depression, the crown of which leads to the usual surface of the runner and it should be noted that the thickened portions 5 provide such a section as will successfully withstand the forces to which the runners are ordinarily subjected.

As clearly shown in Fig. 1 of the drawing, runners of the flexible type may be easily constructed according to my invention and in this particular, it is desirable to point out that, should the runner be flexed to such an extent that the fibers of the metal at the juncture of the flexed portion with the tread portion be permanently displaced, no roughened edge will be presented in contact with the surface over which the runner is drawn, as would result if the runner had an angular section presenting the tread.

It should be particularly noted that by having the head of the runner provided with the curved side sections which are curved throughout their width the curve starting at the center of the longitudinally-extending groove and merging into the flat upper surfaces of the side sections, there will be provided a runner having curved side edges and a curved surface-engaging face. When these runners sink into the snow, they form a track and are not liable to move sidewise since the curved edges and curved lower faces of the head can not readily cut into the snow. If the side sections of the head were provided with flat surface-engaging faces and were not provided with round side edges, the runners would be more liable to skid sidewise since the side edges of the runners would then be provided with sharp edges which could more readily dig into the soft snow. This objection is overcome by having the runners formed as clearly shown in Fig. 2.

I am well aware that it is old to provide depressions in runners, for the purpose of preventing side draft, this being well known particularly in connection with skates where hollow round runners are provided, and I do not claim this idea broadly, however, the provision of a plurality of longitudinally extending rounded faces, separated by a depression, provide a runner which will easily glide over the snow or ice without materially displacing the snow or ice but at the same time, a substantial sustaining surface is provided which will enable the sled to receive motion without undue friction upon the surface over which it moves.

Changes in details may be made without departing from the spirit or scope of my invention; but,

I claim:—

A sled runner of substantially inverted T-shape in cross section having a tread surface composed of two lobes contiguous each other, said lobes defining a cusp in cross section, and a web merging into the lobes opposite the cusp.

In testimony whereof I affix my signature in presence of two witnesses.

FRANK HORNQUIST.

Witnesses:
 SIXTUS LUNDBERG,
 F. G. SHORT.

Copies of this patent may be obtained for five cents each, by addressing the "Commissioner of Patents, Washington, D. C."